United States Patent [19]

Wiener et al.

[11] Patent Number: 4,616,533

[45] Date of Patent: Oct. 14, 1986

[54] STRIPPING DEVICE FOR COAXIAL CABLES

[75] Inventors: Hans Wiener, Täby; Hans Undin, Åkersberga, both of Sweden

[73] Assignee: C. A. Weidmüller GmbH & Co., Detmold, Fed. Rep. of Germany

[21] Appl. No.: 636,541

[22] Filed: Aug. 1, 1984

[30] Foreign Application Priority Data

Aug. 26, 1983 [SE] Sweden ................. 8304627

[51] Int. Cl.[4] ......................... H02G 1/12
[52] U.S. Cl. ......................... 81/9.41; 81/9.44
[58] Field of Search ............. 81/9.4, 9.41, 9.42, 81/9.43, 9.44; 30/90.1, 90.6, 90.7, 90.8

[56] References Cited

U.S. PATENT DOCUMENTS

| | | | |
|---|---|---|---|
| 2,455,591 | 12/1948 | Lindsay | 30/90.1 |
| 3,161,088 | 12/1964 | Tolman | 30/90.7 |
| 4,027,557 | 6/1977 | Stepan | 30/90.1 |

*Primary Examiner*—James L. Jones, Jr.

*Attorney, Agent, or Firm*—Karl F. Ross; Herbert Dubno

[57] ABSTRACT

A stripping device for coaxial cables comprises a handle member and a guiding track member for a predetermined end length of a cable, rotarily mounted in the handle member. Knife means, mounted in a knife holder which is pivotally attached to the guiding track member, are provided to perform at least two spaced incisions in the cable. A locking means connects temporarily an inserted cable non-rotarily with the handle member. By pivoting the knife holder towards the guiding track member and at the same time rotating the guiding track member with the attached knife holder about the cable locked in the handle member, a first incision is made and extended along the whole periphery of the cable by the knife means which is closest to the end of the knife holder remotest from the handle member. The other knife means being unable to enter into operative engagement with the cable at this initial stage, the insulation, cut-through by said first knife member, can unimpededly be displaced in the longitudinal direction of the cable.

27 Claims, 13 Drawing Figures

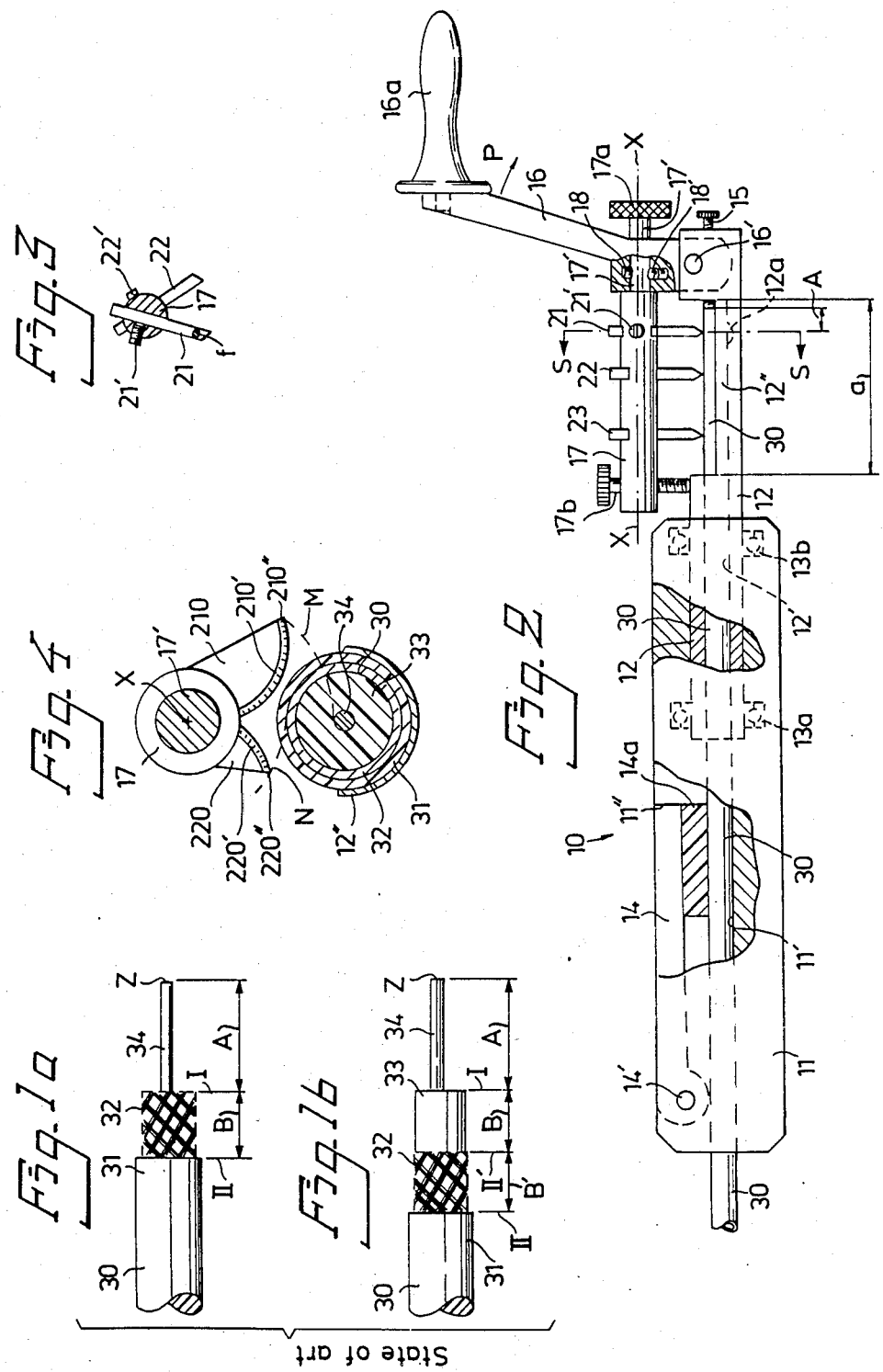

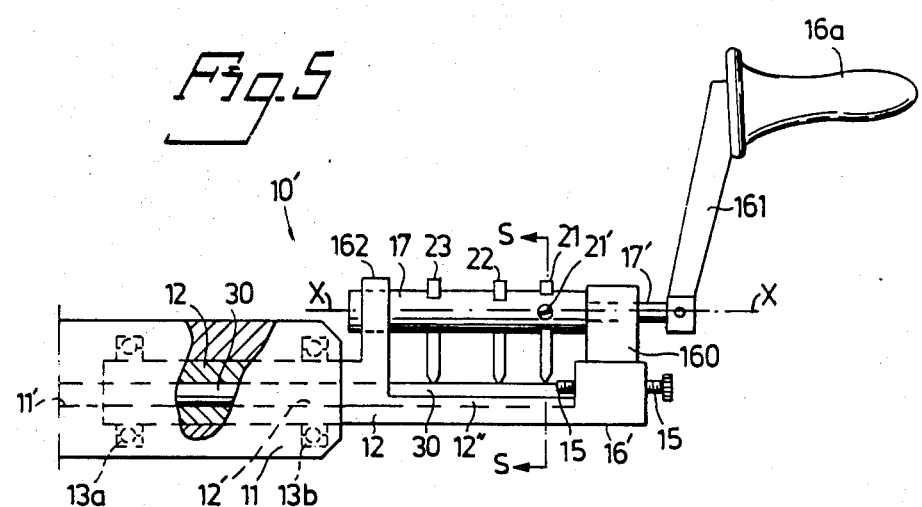
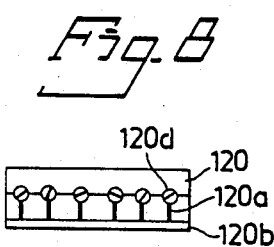
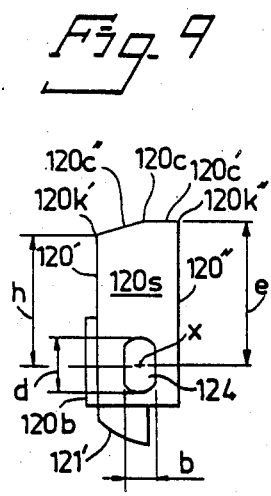
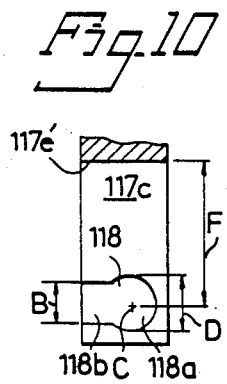
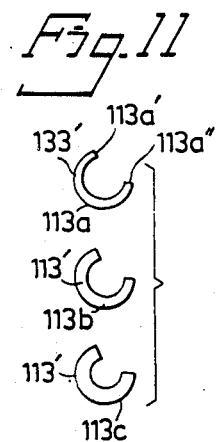

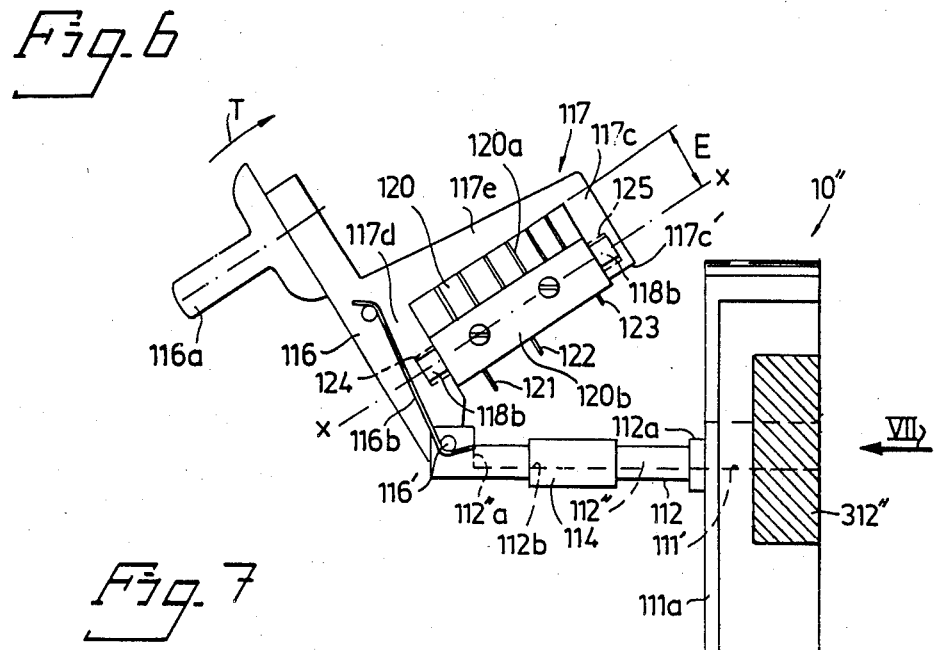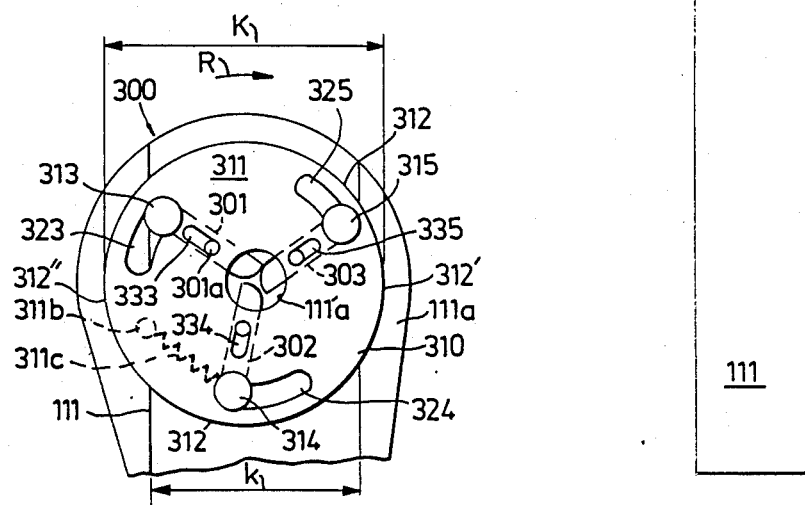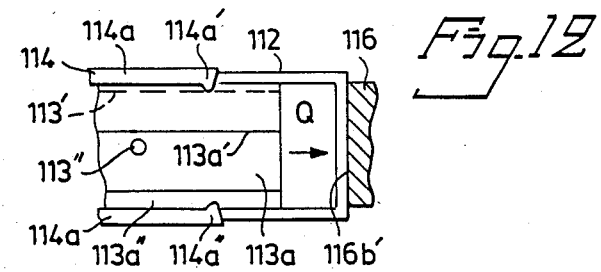

STRIPPING DEVICE FOR COAXIAL CABLES

The invention refers to a stripping device or apparatus for coaxial cables, and specifically to a device of the kind comprising a guiding track for a terminal portion of the cable which shall be stripped, and at least two knives which may be moved around the cable in a rotational movement and which initially perform only a short incision in the insulating sheathing of the cable, whereupon this incision is by said rotary motion extended to the whole periphery of the cable.

A coaxial cable comprises, as known, a conductive core, an inner insulating sheathing enveloping the core, an outer conductive layer (shielding layer) enveloping the inner insulating sheathing, and an outer insulating sheathing enveloping the outher conductive layer. When such a cable is stripped in a device of the kind specified, a deepest first incision is made nearest the end of the cable and passes through all said sheathings and layers down to the core. Spacedly from this first incision a second incision is made which pierces only the outer insulating sheathing, so that when the severed part thereof is removed, the outer conductive layer is uncovered. Between the first and the second incisions a third incision may be made which penetrates through the outer insulating and conductive layers so that after removal of the severed parts a portion of the inner insulating sheathing is exposed.

In a device of the kind specified all said incisions are at first locally limited and afterwards extended to the whole circumference of the cable by a relative rotation of the knives and the cable. The first deepest incision causes the perforated layers to be pushed in the longitudinal direction of the cable. The knife performing the second incision and possible also the knife making the third incision obstructs an unimpeded movement of the layers past the place of the second or third incision respectively. Consequently, a certain congestion of material occurs in the relatively short path between adjacent incisions generating increased friction between the cable and the knives penetrating into the insulation. A greater effort is therefore necessary to perform said relative rotational movement.

In order to reduce such friction it has been proposed (German Pat. No. 3 134 193) to provide in stripping devices of a similar kind (but for non-coaxial cables, where the situation is not aggravated by the congestion of material between two places of incision) in the guiding means for the cable a depression and/or to give the knife a particular cross-sectional shape (that of a thin biconvex lens).

It is an object of the present invention to provide a device in which the braking frictional force of the perforated layers does not exceed, in stripping coaxial cables, said force in stripping non-coaxial cables inclusive the possibility to reduce it further by one or both of the above mentioned known arrangements.

The invention is based on the recognition that when the knives become operative successively, the material pushed away by the first incision may unimpededly pass the place of the future second and possibly also third incision in the same way as when an ordinary cable is stripped with the aid of a sole knife and a sole incision.

The invention will now be described more in detail with the aid of exemplary embodiments according to the enclosed diagrammatic drawings in which FIG. 1a and FIG. 1b show the two above mentioned modes of stripping coaxial cables;

FIG. 2 is a side view, partially in section, of a first embodiment of the device according to the invention;

FIG. 3 is a section along the plane S—S in FIG. 2 through the knife holder of the device of FIG. 2;

FIG. 4 is an analogous section through a modified embodiment of the knife holder and knives;

FIG. 5 is a side view of a second embodiment of the device according to the invention;

FIG. 6 is a side view of a third embodiment of a device according to the invention;

FIG. 7 is a view in the sense of arrow VII of the upper part of the device of FIG. 6;

FIG. 8 is a plan view of the knife cartridge of the device of FIG. 6;

FIG. 9 is a side view on a larger scale of the knife cartridge of the device of FIG. 6;

FIG. 10 is a view on the same scale as FIG. 9 of the inner side of one of the legs of the yoke-shaped knife holder of the device of FIG. 6;

FIG. 11 is a front view of three different guiding track inserts, and

FIG. 12 is a plan view on a greater scale of the outer end of the guiding track member in the device of FIG. 6 with one of the guiding track inserts of FIG. 11 in place.

Parts with equal function are in all drawing figures designated by identical or analogous reference numerals.

According to FIGS. 1a and 1b, which do not directly refer to the present invention, a coaxial cable 30 may be stripped in such a manner that at a preselected distance A from the cable end Z a first incision is made in a plane I as deep as to the conductive core 34 of the cable. At a preselected axial distance B (FIG. 1a) or B+B' (FIG. 1b) therefrom a second incision is made in the plane II, but only through the outer insulating layer 31. Possibly (FIG. 1) also a third incision is made in a plane II', as deep as to the inner insulating layer 33. The severed parts of the insulation are then removed from the cable. In the relatively short section B there will occur congestion of material if all knives operate at the same time, whereby in particular the knife in plane I which penetrates deepest is braked in the subsequent rotary motion. The same occurs also in section B', but to a lesser extent, due to the smaller thickness of the cut-through layers. This method is known.

A device 10 according to the present invention comprises, as shown in FIGS. 2 and 3, an elongate handle member 11, possibly knurled on the surface for better hold by one hand, and in which an axial through-opening 11' is provided. A longitudinal, tubular guiding track member 12, also provided with an axial opening 12', is rotarily mounted in the handle member 11 with the aid of mountings 13a, 13a, in such a manner that the two axial openings 11' and 12' are aligned one with another. These two openings have such a diameter that any coaxial cable 30 to be stripped which has not a greater diameter than a predetermined maximum value for the respective device may be readily introduced into them.

In the handle member 11 is provided, in an elongated slot 11" extending in axial direction, a lever 14 which somewhat projects from the surface of the handle member. The lever 14 is at one of its ends, preferably at the first end which is more remote from the guiding track member, i.e. at 14', pivotally mounted in the handle member 11 and is at the opposite second end provided with a brake element embodied by a rubber block 14a. When the handle member 11 is firmly gripped, the second end of the lever 14 is pushed into the slot and the block 14a is pressed against a coaxial cable 30 inserted in the opening 11′, whereby the cable is non-rotarily locked with the handle member 11.

The material of the guiding track member 12 is, in the part projecting from the handle member 11, along a preselected distance removed to a certain part of the cross-section, e.g. approximately half the cross-section, whereby the axial opening 12′ is converted into a trough or support bed for a terminal part of the coaxial cable 30 comprising the sections or distances A+B or A+B+B′. Said trough defines the guiding track 12″proper. A settable end stop screw 15 allows an exact setting of the distance A.

At the free end of the guiding track member 12 remote from the handle member 11 is a projecting lever arm 16 pivotally mounted substantially at right angles to the guiding track 12″. The lever arm 16 is at its free end provided with a rotarily mounted crank handle 16a and defines therewith a crank member.

In the foot part of the lever arm 16 is an elongate knife holder 17 mounted for limited pivotal movement with the aid of a mounting pin 17′. The knife holder 17 extends spacedly along the guiding track 12″ and parallelly therewith in operative position. The knife holder 17 may be with the aid of a setting knob 17a, provided on the projecting free end of the mounting pin 17′, brought into two different end positions defined by a stop pin 18 which projects from the mounting pin 17′ and travels in a circular groove in the foot part of the lever arm 16. The two end positions may e.g. differ with ±25° and said circular groove entends then along 50° and the both ends thereof define the two end positions of the knife holder.

In transversal bores in the e.g. cylindrically shaped knife holder 17 are the knives 21 (for the incision at I), 22 (for the incision at II′) and 23 (for the incision at II) mounted and affixed in selected longitudinal position with the aid of screws such as 21′, 22′. The arrangement is however such that the knives 22 and 23 (the knife 23 is in FIG. 3 totally covered by the knife 22 and therefore not visible) have in cross-sectional direction another angular position than the knife 21. By operating the setting knob 17a, the knife holder 17 is brought either in a first end position for operative engagement only of the knife 21, or in a second end position for operative engagement of the knife 22 and a possible third knife 23.

At the end of the knife holder 17 which is turned to the handle member 11 is a stop provided for defining the operative position of the knife holder shown in FIG. 2. In the example illustrated, the stop is settable and is defined by a setting screw 17b the end of which may bear against a not removed part of the guiding track member.

The rod-shaped knives 21 to 23 may in cross-section preferably have the known shape of a thin biconvex lens, as shown at f. In the guiding track 12″ can be provided a recess 12a at the location of the plane I or S-S. The said cross-sectional shape as well as said recess have the purpose to further reduce the friction of the knife relative to the insulation layers, the recess 12a being provided for accomodating a local bulge occuring on the insulation layers when being cut-through.

The device is operated in the following manner:

The setting screw 15 is set for a desired length A and the lever arm 16 is pivoted in the sense of arrow P, whereby the knife holder 17 is brought into a rest position in which the guiding track 12″ is free from the knives 21 to 23. Moreover, the setting knob 17a may be operated so that the knife holder 17 occupies a non-operative intermediate rotary position (see FIG. 4) in which even in the operative pivotal position of the knife holder according to FIG. 2 no knife is in operative engagement with the cable. Said intermediate non-operative rotary position of the knife holder 17 is secured by a spring-loaded ball 18′ provided in the foot part of the lever arm 16 and which may slip into a corresponding recess in the mounting pin 17′ of the knife holder 17.

Thereupon, a cable 30 is introduced into the aligned openings 11′, 12′ and 12″ until it bears against the setting screw 15 and the lever arm 16 is again pivoted in the sense of arrow P until the stop screw 17b bears against the guide track member 12.

The user holds with one hand the handle member 11, whereby the lever 14 is depressed and the rubber block 14a bears against the inserted cable. Thereupon, the knob 17a is operated and the knife holder 17 is pivoted so that the knife 21 penetrates into the cable 30. By this movement are the knives 22 and 23 still more spaced from the cable. During at least one full turn of the guiding track member 12 relative the handle member 11 and around the inserted cable 30, performed with the aid of the crank handle 16a, operated by the user's other hand, is the hitherto limited incision of the knife 21 extended to the whole circumference of the cable 30, the insulation layers being in no way prevented from freely displacing themselves in the axial direction of the cable (to the left in FIG. 2).

The guiding track 12″ rotates thus around the stationary cable 30, pressed against the guiding track by the operating knife. To facilitate this operation, the guiding track 12″ may be preferably provided with a friction reducing inner lining of some plastics material known for the purpose (see FIG. 11).

When operating anew, the knob 17a of the knife holder 17 is brought into the second end position where the knife 21 has been removed from the cable and the knives 22 and 23 perform incisions. During at least one further turn are also the incisions of the knives 22 and 23 extended to the whole circumference of the cable 30. Thereupon is the knife holder 17 brought into the rest position by pivoting the lever arm 16 in the sense of arrow P and/or is brought into the non-operative rotary position by operating the knob 17a, and the cable 30 is withdrawn from the device (to the left in FIG. 2). The knife holder 17 may possibly also remain in its operative or engagement position, so that the severed parts are held fast by the knives and stripped off the cable as the cable is drawn out.

In FIG. 4 is shown an alternative embodiment of the knives where the knives 210 and 220 have circular cutting edges 210′ and 220′ which attack the cable 30, in the same way as the knives 21, 22, from opposite sides, and whose end points 210″, 220″ move, also in the same manner as the points of the knives 21 and 22 in FIG. 3, along circular paths M and N when being brought into operative position.

It will be realised that the pivotal movement of the knife holder 17 about the pivot point 16′ in FIG. 1 also can be substituted by a rectilinear parallel approachment movement. Either movement may however also be totally omitted when for the introduction of the cable only the above said intermediate non-operative rotary position (e.g. according to FIG. 4) of the knife holder is used. A device 10' of this kind is shown in FIG. 5. The knife holder 17 is at both sides mounted for limited rotation to a predetermined extent in mounting blocks 160, 162 and extends parallel to the guiding track 12". The handle 16a is arranged on an arm 161 which, in the same way as the knob 17a in FIG. 2, is non-rotarily connected with the knife holder 17.

Upon operation of the handle 16a, e.g. by clockwise rotation, the knife holder 17 is first brought into its end position for full operative engagement of the knife 21 with the bolt 18 (FIG. 2) bearing against one end of the circular groove, and then the whole part 12 is rotated. After at least one full turn the handle 16a is operated for rotation in the reverse sense, and the procedure is repeated for the knives 22 and 23 (after the bolt 18 has reached the opposite end of the circular groove). In at least one of the mounting blocks 160, 162 the above mentioned stop device with the spring loaded ball 18' is provided for defining the intermediate non-operative rotary position.

The device 10" according to FIGS. 6 to 12 has an elongate handle member 111, in one end of which is provided a through-opening 111', transverse to the longitudinal direction of the handle member. A guiding track member 112 is rotarily mounted in the handle member 111 adjacent the through-opening 111'. The guiding track member projects thus at right angles from the handle member at one side thereof. A guiding track 112' is provided in the guiding track member 112 similar to guiding track 12" provided in the guiding track member 12 of FIG. 2

A yoke-shaped knife holder 117 is with the aid of a pin 116' pivotally mounted at the free end of the guiding track member 112 which is remote from the handle member 111. The knife holder 117 has a projecting lever arm 116 which is provided with a crank handle 116a. A U-shaped spring 116b holds the knife holder in the pivotal rest position shown in the drawing. The spring 116b has two hooked legs which each extends along one side of the knife holder, and a web portion 116b' (FIG. 12) which straddles the end of the guiding track 112'. The knife holder 117 has legs 117c, 117d which projects from a web portion 117e and define a central space in which a knife cartridge 120 is accommodated.

The knife cartridge 120 has essentially the shape of a thick planparallel plate with a front face 120' and a rear face 120" and is provided with a plurality of rectilinear notches such as 120a which extend from the front face 120' to approximately half the thickness of the cartridge 120 and which may be equipped with knives such as 121, 122, 123. The notches 120 are locked by a cover plate 120 screwed to the front face 120'. In order that the knives 121 to 123 may be in the notches exactly set in their longitudinal direction, tapped bores can according to FIG. 7 be provided at least along a part of the lenth of these notches, and small setting screws 120d (FIG. 8) may be arranged in these holes bearing against the inner ends of the knives.

The cartridge 120 is mounted in the following manner in order to be easily replaceable by another cartridge, e.g. with otherwise distributed notches. At the inner face of each leg 117c, 117d is a key-hole shaped groove 118 provided having a broader circular part 118a with a diameter D and an adjoining narrower straight part 118b having a width B. The straight part 118b extends at right angles to the direction of the legs 117c, 117d and of the lever arm 116. From both side faces 120s of the cartridge 120 project short mounting taps 124, 125 defined by two planar and two cylindrical surfaces and whose cross-sectional shape best will be seen in FIG. 9. The planar faces extend parallel with the front and rear faces 120', 120" of the cartridge 120 at a mutual spacement b corresponding to the width B of the straight part 118b of the notch 118. The cylindrical surfaces extend between the planar surfaces at a mutual spacement d corresponding to the diameter D of the circular part 118a of the notch 118.

The distance e between the longitudinal axis x of the taps 124, 125 and the upper edge 120k" of the rear face 120" corresponds exactly to the distance F between the center C of the circular part 118a of the notch 118 and the lower limiting surface 117'e of the web part 117e.

The distance h between the longitudinal axis x and the uppger edge 120k' of the front 120' is shorter than the distance e, at least to the extent that it lies on a circular arc drawn from x with a radius equal to the distance between x and 120k". Within this limitation, the upper face 120c of the cartridge 120 may be curved, tapered, or, as shown in the drawing, broken, i.e. comprising a first planar portion 120c' adjacent and at right angles to the rear face 120", and a second planar portion 120c" sloping relative thereto and adjacent to the front face 120'. The cartridge 120 will then be brought into operative position with a certain snap effect depending on the width of said first portion and on the resiliency of the concerned parts.

For insertion, the cartridge 120 is with its mounting taps 124, 125 introduced into the groove 118 in such a position that the planar faces of the mounting taps glide along the straight walls of the groove portions 118b, the front face 120' of the cartridge 120 being turned toward the web portion 117e of the knife holder 117. When the mounting taps 124, 125 have reached the circular groove portions 118a, the cartridge 120 is turned through 90° till the upper edge 120k" bears against the web portion 117e. It will be realised that the above stated distance of the edges 120k' and 120k" allows such a rotation through 90°, but not farther.

When the crank handle 116 is operated clockwise, the knives 121 to 123 engage with their arcuate cutting edges such as 121' the cable 30 and press the edge 120k" still more against the web portion 117e. Upon removal, the cartridge 120 is first tipped through 90° and then the reverse procedure as upon insertion is applied.

The locking means in the device 10" consists of an automatic chuck 300 with three elongated clamping jaws 301, 302, 303. In the handle member 111 is a pot-shaped operating member 310 rotarily mounted with its bottom wall 311 turned outwardly. The operating member 310 is provided with a milled outer side face 312 which has a diameter K somewhat greater than the width k of the handle member 111, so that the parts 312', 312" of the side wall 312 project laterally from the handle member 111 and can be easily operated by the fingers of the hand which grasps the handle member.

Three pins 313, 314, 315 are stationarily mounted in the handle member 111 around the through-opening 111' at a mutual angular spacement of 180°. The pins 313 to 315 have a narrower shank portion, which is not seen in the drawing because it is located beneath the bottom wall 311, and a wider head portion above the bottom wall 311. On each shank portion is one of the clamping jaws 301 to 303 rotarily mounted with its free end. The bottom wall has at its center a circular orifice 111'*a* of the through-opening 111' and at the periphery three circular, arcuated slots 323, 324, 325 extending parallel with the side faces 312. Between these slots and said orifice 111'*a* are three radially extending straight slots 333, 334, 335 provided having a width which corresponds to the diameter of the shank portions of the pins 313 to 315 and is smaller than the diameter of the head portions thereof. The operating member 310 is thus retained in the handle member 111 by the pins 313 to 315 with a possibility to rotate as much as the length of the slots 323 to 325 allows.

Projecting engagement pins such as 301*a* are provided in the clamping jaws 301 to 303 spacedly from the pivot points of the jaws and mesh with the radial slots 333 to 335 in the bottom wall 311. A traction spring member 311*c*, provided in the interior of the operating member 310, e.g. between the pin 314 and a pin 311*b* projecting inwardly from the bottom surface 311, holds the operating member 310 with predetermined force in the position shown in FIG. 7 in which the chuck 300 is closed. A protective wall 111*a*, projecting from the handle member 111, protects the finger or fingers which operate the operating member 312 from slipping-off into the region of the knife holder 117.

The device is operated as follows. By grasping at least one of the parts 312', 312" of the side surface 312, the operating member 312 is turned in the sense of arrow R overcoming the force of the spring means 311*c*, until the pins 313 to 315 bear against the opposite ends of the slots 313 to 315 than as shown in FIG. 6. Thereby are the clamping jaws 301 to 303 via the slots 333 to 335 and the pins such as 301*a* pivoted about the pins 313 to 315 so that the orifice 111'*a* is set free.

The cable to be stripped is inserted into the through-opening 111' and into the guiding track 112" until it is stopped at 112*a*". Thereupon is the operating member relieved so that the spring 311*c* turns it against the sense of the arrow R and the clamping jaws 301 to 303 grasp the cable and via the pins 313 to 315 connect it non-rotarilly with the handle member 111.

The user grasps with his other hand the crank handle 116*a* and, overcoming the relatively weak spring 116, pivots the knife holder 117 in the sense of arrow T till the knife 121, located closest to the leg 117*d*, touches the inserted cable. It will have been understood from the explanations to FIGS. 1*a* and 1*b* that this always will be the knife having to perform the deepest incision, and which therefore projects most from the knife holder.

Now the rotation of the whole knife holder 117 inclusive the guiding track member 112 around the cable is started, and at the same time the pivotal movement in the sense of arrow T is continued. Consequently, the knife 121 penetrates successively deeper and deeper into the cable, and after some time also the knife 122, and any possible further knife closer to the handle member 111, such as knife 123, touches the cable and begins to penetrate therein.

The delay in the engagement of the individual knives is partly due to the fact that any other knife than that which is located closest to the leg 117*d* projects less from the knife holder, but mainly to the circumstance that any such knife is more spaced from the pivot pin 116' than the afore said knife. The pivotal movement in the sense of arrow T is terminated when the lower end 117*c*' of the leg 117 comes to bear against a collar 112*a* at the guiding track member 112. Then, or at the utmost a few turns later, also the rotational movement is ceased and the stripping operation is finished.

It will be recognised from the procedure described that, in analogy to the device 10 of FIG. 2, parts of the insulation still can after the first operative engagement of the knife 121 readily be displaced in the longitudinal direction of the cable.

The device 10" has the advantage that the user exactly feels with the hand operating the crank handle 116 which resistance any singular cable offers and can determine how fast or slow the pivotal motion in the sense of arrow T, as well as the rotation about the cable, may proceed.

In order that cables with different diameters may be treated in the device 10", exchangeable elongated inserts 113*a* to 113*c* (FIG. 11), having the shape of a longitudinal cut-off tube, are preferably provided for the guiding track member 112. All inserts have the same outer diameter, but different inner diameters. A slide 114 is arranged at the outside of the guiding track member 112 and is provided (FIG. 12) with bent longitudinal edges 114*a*, each having at its outer end a projecting engagement claw 114*a*', 114*a*". The slide 114 is mounted on the longitudinal edges of the guide track member 112 with the aid of said bent longitudinal edges, one of the engagement claws, e.g. claw 113*a*, grasping one of the longitudinal edges, e.g. 113*a*, of the insert mounted in the guide track member. The other claw, 114*a*', is engaged in a longitudinal groove 113*a*' which is provided in the outer surface of the insert, spacedly from and parallel with the other longitudinal edge 113*a*' of the guiding track member. The insert is thus mounted in the guiding track member 112 in an oblique position as shown in FIG. 11, because both engagement claws 114*a*', 114*a*" are situated at the same level.

The inserts are somewhat shorter than the guiding track, as will be recognised in FIG. 12, and have in their bottom region an opening 113" into which a short pin 112*b* projects which is arranged in the bottom region of the guiding track member. The slide 114 is shorter than the guiding track member (see FIG. 6) and for inserting and removing the inserts 113*a* to 113*c*, the slide 114 is pushed to the end of the guiding track which is remote from the handle 111, i.e. to the right in FIG. 12 (arrow Q). Thereby the engagement claw 114*a*' leaves the groove 113' and the engagement claw 114*a*" leaves the longitudinal edge 113*a*", and the insert may be set on or lifted from the pin 112*b*.

We claim:
1. A stripping device for coaxial cables, comprising:
an elongate handle member;
an elongate guiding track member for a terminal portion of a coaxial cable to be stripped, said guiding track member exposing a part of the surface of the insulating sheathing of an inserted cable for treatment and extending between a first end, attached to the handle member, and a second end, remote from the handle member;
an elongate knife holder movably attached to said guiding track member, and at least two knife means arranged spacedly in said knife holder for perfoming in said exposed insulation parts a short incision which by relative rotation of the cable and the knife holder may be extended to the whole circumference of the cable; and
a locking means; wherein;
the handle member is provided with a through-opening for the cable;

the locking means is provided in association with the handle member to temporarily non-rotarily lock a cable inserted in said through-opening with the handle member;

the guiding track means and the knife holder are with the aid of a crank means jointly rotatable relative to the handle member; and the knife holder is settable relative to the guiding track member so that in the initial phase of a stripping operation, only the knife located nearest to said second end of the guiding track member and performing the deepest incision is brought into engagement with the cable and a translatorial motion of the insulation caused by such incision is not impeded by other knives in engagement with the cable.

2. A stripping device for coaxial cables, comprising an elongate handle member; an elongate guiding track member for a terminal portion of a coaxial cable to be stripped, said guiding track member exposing a part of the surface of the insulating sheathing of an inserted cable for treatment and extending between a first end, attached to the handle member, and a second end, remote from the handle member; an elongate knife holder movably attached to said guiding track member, and at least two knife means arranged spacedly in said knife holder for performing in said exposed insulation part a short incision which by relative rotation of the cable and the knife holder may be extended to the whole circumference of the cable, wherein the handle member is provided with a through-opening for the cable;

a locking means is provided defined by a chuck which by a spring means is automatically held in closed position, said locking means being provided in association with the handle member to temporarily non-rotarily lock a cable inserted in said through-opening with the handle member;

the guiding track member and the knife holder are jointly rotatable relative to the handle member; and the knife holder is settable relative to the guiding track member so that in the initial phase of a stripping operation, only the knife located nearest to said second end of the guiding track member and performing the deepest incision is brought into engagement with the cable and a translatorial motion of the insulation caused by such incision is not impeded by other knives in engagement with the cable.

3. The device of claim 2, wherein the knife holder is pivoted to the guiding track member at said second end thereof for pivotal movement about an axis at right angles to the longitudinal direction of the guiding track member between a rest position obliquely to said longitudinal direction and an operative position at least approximately parallel therewith, co-operating stop means, defining said operative position in the final phase of a stripping operation, being provided at said first end of the guiding track member and at the corresponding end of the knife holder.

4. The device of claim 2, wherein the knife holder is yoke-shaped, provided with a projecting leg at each end, and is at the end of one said leg pivotally connected to the guiding track member and at the end of the other leg is provided with one of said stop means, a replaceable knife cartridge being mounted in a space between the two legs, and said knife means being mounted in said cartridge.

5. The device of claim 2, wherein a plurality of interchangeable inserts into the guiding track is provided for the treatment of cables with different diameters.

6. The device of claim 2, wherein the guiding track member extends at right angles to the handle member.

7. The device of claim 2, wherein the guiding track member extends in alignment with the handle member.

8. The device of claim 2 wherein the knife holder is rotatable about its longitudinal axis between two lateral end positions and the knife means which is located closest to the second end of the knife holder is positioned to operatively engage the cable in one of said end positions from a side reverse from the other knife means in the second said end position, so that by pivoting the knife holder between the two end positions either only the first mentioned knife means, or only the other knife means comes into engagement with the cable.

9. The device of claim 2, wherein at least one knife means has an arcuate cutting edge.

10. The device of claim 2, wherein at the location of at least one incision a depression is provided in the guiding track for accommodation of a bulging part of the insulation.

11. The device of claim 3, wherein a lever arm or crank handle is mounted to the knife holder at the end thereof where the knife holder is pivoted to the guiding track member.

12. The device of claim 3 wherein said cooperating stop means are settable.

13. The device of claim 2, wherein settable end stop means are provided at said second end of the guiding track member.

14. The device of claim 2, wherein said knife means are settably mounted in said knife holder so as to be affixable in a selected longitudinal position.

15. A stripping device for coaxial cables, comprising an elongate handle member; an elongate guiding track member for a terminal portion of a coaxial cable to be stripped, said guiding track member exposing a part of the surface of the insulating sheathing of an inserted cable for treatment and extending between a first end, attached to the handle member, and a second end, remote from the handle member; an elongate knife holder movably attached to said guiding track member, and at least two knife means arranged spacedly in said knife holder for performing in said exposed insulation part a short incision which by relative rotation of the cable and the knife holder may be extended to the whole circumference of the cable, wherein the handle member is provided with a through-opening for the cable;

a locking means is provided in association with the handle member to temporarily non-rotarily lock a cable inserted in said through-opening with the handle member;

the guiding track means and the knife holder are jointly rotatable relative to the handle member and the guiding track member extends at right angles to the handle member;

the knife holder is settable relative the guiding track member so that in the initial phase of a stripping operation, only the knife located nearest to said second end of the guiding track member and performing the deepest incision is brought into engagement with the cable and a translatorial motion of the insulation caused by such incision is not impeded by other knives in engagement with the cable.

16. the device of claim 15, wherein the knife holder is pivoted to the guiding track member at said second end thereof for pivotal movement about an axis at right angles to the longitudinal direction of the guiding track member between a rest position obliquely to said longitudinal direction and an operative position at least approximately parallel therewith, co-operating stop means, defining said operative position in the final phase of a stripping operation, being provided at said first end of the guiding track member and at the corresponding end of the knife holder.

17. The device of claim 16, wherein the knife holder is yoke-shaped, provided with a projecting leg at each end, and is at the end of one said leg pivotally connected to the guiding track member and at the end of he other leg is provided with one of said stop means, a replaceable knife cartridge being mounted in a space between the two legs, and said knife means being mounted in said cartridge.

18. The device of claim 16, wherein a plurality of interchangeable inserts into the guiding track is provided for the treatment of cables with different diameters.

19. The device of claim 16, wherein the locking means is defined by an elongated lever pivotally mounted in an elongated slot in the handle member, partially projecting from the surface of the handle member and at its free end provided with a brake element which can be pressed gainst an inserted cable.

20. The device of claim 16, wherein the knife holder is rotatable about its longitudinal axis between two lateral end positions and the knife means which is located closest to the second end of the knife holder is positioned to operatively engage the cable in one of said end positions from a side reverse from the other knife means in the second said end position, so that by pivoting the knife holder between the two end positions either only the first mentioned knife means or only the other knife means comes into engagement with the cable.

21. The device of claim 16, wherein at least one knife means has an arcuate cutting edge.

22. The device of claim 16, wherein at the location of at least one incision a depression is provided in the guiding track for accommodation of a bulging part of the insulation.

23. The device of claim 16, wherein a lever arm or crank handle is mounted to the knife holder at the end thereof where the knife holder is pivoted to the guiding track member.

24. The device of claim 16, wherein said cooperating stop means are settable.

25. The device of claim 16, wherein settable end stop means are provided at said second end of the guiding track member.

26. The device of claim 16, wherein said knife means are settably mounted in said knife holder so as to be affixable in a selected longitudinal position.

27. A stripping device for coaxial cables, comprising an elongate handle member; an elongate guiding track member for a terminal portion of a coaxial cable to be stripped, said guiding track member exposing a part of the surface of the insulating sheathing of an inserted cable for treatment and extending between a first end, attached to the handle member, and a second end, remote from the handle member; an elongate knife holder movably attached to said guiding track member, and at least two knife means arranged spacedly in said knife holder for performing in said exposed insulation part a short incision which by relative rotation of the cable and the knife holder may be extended to the whole circumference of the cable, and a locking means; wherein
the handle member is provided with a through-opening for the cable;
the locking means is provided in association with the handle member to temporarily non-rotarily lock a cable inserted in said through-opening with the handle member;
the guiding track means and the knife holder are with the aid of a crank means jointly rotatable relative to the handle member;
the knife holder is settable relative to the guiding track member so that in the initial phase of a stripping operation only the knife located nearest to said second end of the guiding track member and performing the deepest incision is brought into engagement with the cable and a translatorial motion of the insulation caused by such incision is not impeded by other knives in engagement with the cable;
the knife holder being yoke-shaped, provided with a projecting leg at each end, and is at the end of one said leg pivotally connected to the guiding track member and at the end of the other leg is provided with one of said stop means, a replaceable knife cartridge being mounted in a space between the two legs, and said knife means being mounted in said cartridge;
said knife cartridge being at each end provided with a mounting tap and being with the aid of these mounting taps in a first rotational position introduceable into key-hole shaped grooves provided at the inner faces of said legs and in a second rotational position lockable therein in an operative position.

* * * * *